United States Patent
Wang et al.

(10) Patent No.: US 10,018,704 B2
(45) Date of Patent: Jul. 10, 2018

(54) SNOOPING SENSOR STA OR NEIGHBOR AP RANGING AND POSITIONING IN WIRELESS LOCAL AREA NETWORKS

(71) Applicant: MEDIATEK Singapore Pte. Ltd., Singapore (SG)

(72) Inventors: James June-Ming Wang, San Marino, CA (US); Chih-Shi Yee, Hsinchu County (TW); Thomas Edward Pare, Jr., Mountain View, CA (US); YungPing Hsu, Taipei (TW); Chao-Chun Wang, Taipei (TW); Yuh-Ren Jauh, Taoyuan County (TW); Kun-Chien Hung, Pingtung County (TW); Gabor Bajko, Santa Clara, CA (US)

(73) Assignee: Mediatek Singapore Pte. Ltd., Singapore (SG)

( * ) Notice: Subject to any disclaimer, the term of this patent is extended or adjusted under 35 U.S.C. 154(b) by 82 days.

(21) Appl. No.: 14/515,901

(22) Filed: Oct. 16, 2014

(65) Prior Publication Data

US 2015/0139212 A1    May 21, 2015

Related U.S. Application Data (60) Provisional application No. 61/892,259, filed on Oct. 17, 2013, provisional application No. 61/892,266, (Continued)

(51) Int. Cl.
*G01S 5/06* (2006.01)
*H04W 64/00* (2009.01)
(Continued)

(52) U.S. Cl.
CPC .............. *G01S 5/06* (2013.01); *G01S 13/878* (2013.01); *H04W 64/00* (2013.01); *H04W 84/12* (2013.01)

(58) Field of Classification Search
CPC .......... G01S 5/06; H04L 12/28; H04W 48/00; H04W 56/00; H04W 64/00; H04W 84/12
(Continued)

(56) References Cited

U.S. PATENT DOCUMENTS 9,222,785 B2 * 12/2015 Banin ...................... G01S 5/021
2008/0039119 A1 * 2/2008 Crawford ................ G01S 5/021
                                                      455/456.1
(Continued)

FOREIGN PATENT DOCUMENTS

WO    WO 2012175360 A1 * 12/2012 .......... H04L 5/0035

OTHER PUBLICATIONS

Erik Lindskog et al., Client Positioning Using Timing Measurements between Access Points, doc.: IEEE 802.11-13/0072r0, Jan. 2013.*

(Continued)

*Primary Examiner* — Omar J Ghowrwal
*Assistant Examiner* — Kokou R Detse
(74) *Attorney, Agent, or Firm* — Imperium Patent Works; Zheng Jin; Mark Marrello (57) ABSTRACT

A method of a ranging and positioning with sensor STA/neighbor AP is proposed. An initiating wireless device establishes an FTM procedure with a responding wireless device in an indoor wireless local area network. The initiating device exchanges FTM frames with the responding device and thereby receiving a first set of timestamps from the responding device. The initiating device receives a second set of timestamps associated with the exchanged FTM frames from one or more listening devices. Finally, the initiating device determines location information from the first and the second set of timestamps.

24 Claims, 9 Drawing Sheets

STA INITIATED FTM WITH SENSOR STA/NEIGHBOR AP RANGING AND POSITIONING

Related U.S. Application Data filed on Oct. 17, 2013, provisional application No. 61/898,057, filed on Oct. 31, 2013.

(51) Int. Cl.
*G01S 13/87* (2006.01)
*H04W 84/12* (2009.01)

(58) Field of Classification Search
USPC .......................................... 370/338
See application file for complete search history.

(56) References Cited

U.S. PATENT DOCUMENTS

| | | | |
|---|---|---|---|
| 2010/0157825 A1* | 6/2010 | Anderlind ........... | H04L 12/5695 370/252 |
| 2011/0090939 A1* | 4/2011 | Diener ................. | H04L 1/0001 375/136 |
| 2012/0175360 A1 | 7/2012 | Toyoshima et al. .......... | 219/264 |
| 2013/0235864 A1 | 9/2013 | Do et al. ....................... | 370/350 |

OTHER PUBLICATIONS

International Search Report and Written Opinion of International Search Authority for PCT/US14/60985 dated Jan. 14, 2015 (9 pages).
EPO, Search Report for the EP patent application 14854052.9 dated Feb. 9. 2017, 2017 (7 pages).
Naveen Kakani et al., CIDs 1424, 1671, 1418 Regarding Fine Timing Measurement, IEEE P802.11 Wireless LANs, doc.: IEEE 802.11-13/1178r0, Jan. 2013.

* cited by examiner (PRIOR ART)
FIG. 1A (PRIOR ART)
FIG. 1B

SENSOR STAS/NEIGHBOR APS RANGING AND POSITIONING

STA INITIATED FTM WITH SENSOR STA/NEIGHBOR AP
RANGING AND POSITIONING

SNOOPING SENSOR STA OR NEIGHBOR AP RANGING AND POSITIONING IN WIRELESS LOCAL AREA NETWORKS

CROSS REFERENCE TO RELATED APPLICATIONS

This application claims priority under 35 U.S.C. § 119 from U.S. Provisional Application No. 61/892,259, entitled "Neighbor AP Listen-Only Ranging and Locationing," filed on Oct. 17, 2013; U.S. Provisional Application No. 61/892,266, entitled "Single AP Sensor Network Ranging and Locationing," filed on Oct. 17, 2013; U.S. Provisional Application No. 61/898,057, entitled "Snooping Sensor STA/Neighbor AP Ranging and Locationing," filed on Oct. 31, 2013, the subject matter of which is incorporated herein by reference.

TECHNICAL FIELD

The disclosed embodiments relate generally to wireless network communications, and, more particularly, to snooping sensor STA or neighbor AP ranging and positioning in wireless local area networks.

BACKGROUND

IEEE 802.11 is a set of media access control (MAC) and physical layer (PHY) specification for implementing wireless local area network (WLAN) communication, in the unlicensed (2.4, 3.6, 5, and 60 GHz) frequency bands. The standards and amendments provide the basis for wireless network products using the IEEE 802.11 frequency bands. IEEE 802.11 plays an important role in the growing application of Indoor/Outdoor Location. The key applicable technology is that of ranging using time-of-flight (TOF) ranging measurements defined in IEEE 802.11v. Once the distance between devices is measured, the information can be used to determine device location.

In IEEE 802.11-REVmc, Fine Timing Measurement (FTM) protocol is proposed for Indoor Location. Based on FTM, an initiating station exchanges FTM frames with a responding station to measure the time-of-flight (TOF) or the Round Trip Delay (RTD/2). The initiating station then computes its range to the responding station after receiving timing measurements (i.e., timestamps corresponding to the departure time and arrival time of the FTM frames) from the responding station. To calculate a station position, the station performs ranging measurements with multiple access points (APs) via FTM frame exchange and obtains AP's positions. FTM positioning requires the initiating station to exchange FTM frames with multiple responding APs for TOF measurements in order to determine its absolute location. For 3D positioning, the station needs to exchange FTM frames with four APs in order to determine its absolute location.

Figure 1A:
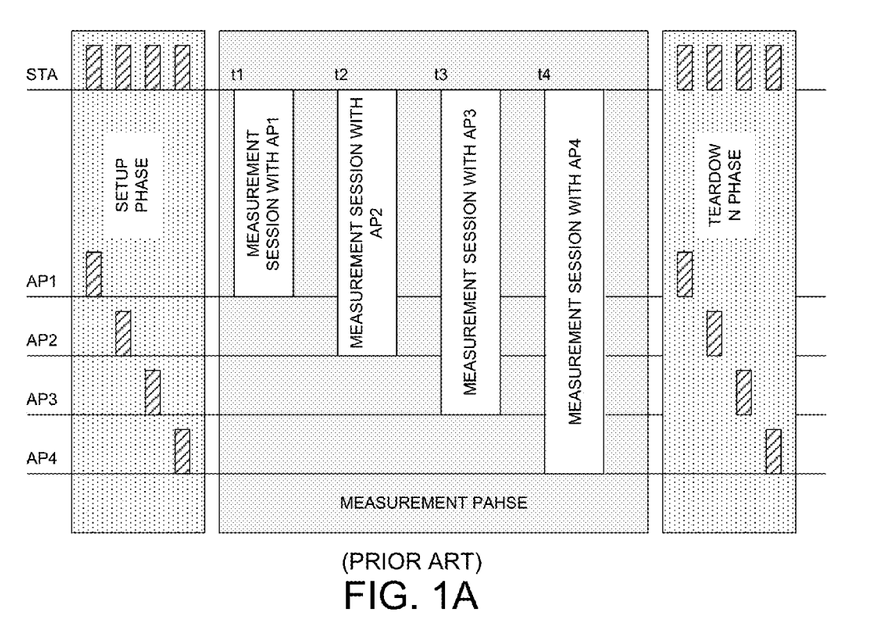
FIG. 1A (Prior Art) illustrates conceptually an FTM positioning procedure.

FIG. 1 (Prior Art) illustrates conceptually an FTM positioning procedure. As illustrated in FIG. 1, a typical FTM positioning procedure starts with a setup phase, followed with a measurement phase, and ended with a tear down phase. During the setup phase, the initiating station STA sends an FTM request or FTM requests to each of the responding APs, AP1-AP4, and wait for acknowledgments (ACKs) from AP1-AP4. In communicating with each responding AP, the initiating station STA might be required to switch to the operating channel of the responding AP if the station's current channel is different from the operating channels of the AP. The FTM request contains FTM related parameters including the start time and the duration of the subsequent FTM frame exchange. After the setup phase, the STA starts the measurement phase with each AP. During each measurement session, the STA exchanges FTM frames and obtains measurement results for TOF with each AP and thereby computing its distance to the corresponding AP. A dialog token carried within the FTM frame is used as an identification of the corresponding timestamp measurements at the AP and the STA. Timestamps and dialog token, which identifies the FTM (and ACK) frames in which timestamps are measured, are transferred together for use in range calculation. Again, channel switching between each measurement session may be needed if the wireless operating channels of the APs are different. After four measurement sessions with AP1-AP4 are completed, the STA is then able to determine its absolute location given the APs' positions. Finally, the STA and the APs go through a tear down phase to end the FTM positioning procedure if the tear town has not already been specified during the set up phase.

The FTM protocol suffers from a list of drawbacks. First, the station possibly needs to switch to different channels in which the APs operate on. Second, the station needs to consume high power due to the long sessions of FTM frame exchange. Third, dense AP deployment is required to provide good coverage for supporting FTM positioning. Fourth, FTM traffic load increases when more stations perform positioning. The FTM protocol overhead can be substantial since all stations in a dense environment need to perform ranging independently.

Figure 1B:
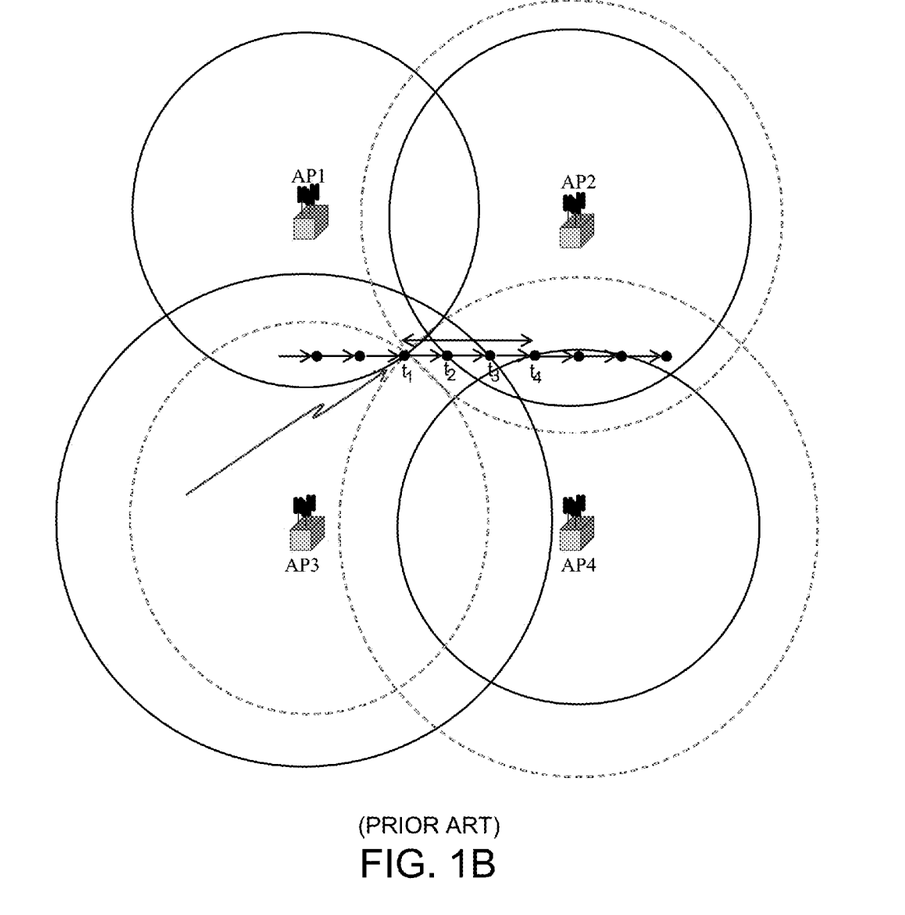
FIG. 1B (Prior Art) illustrates TOF measurements at different time during an FTM positioning procedure.

In addition to the above-illustrated drawbacks of the FTM protocol, the TOF measurements with different responder APs at different time instances introduce uncertainties in the position solution. FIG. 1B (Prior Art) illustrates TOF measurements at different times. In the example of FIG. 1B, the dashed line depicts TOF measurements done at the same time instance, while the solid line depicts TOF measurements done at different time instances. It can be seen that unique position solution can be achieved only if all TOF measurements are performed at the same time instance. On the other hand, at different time instances t1, t2, t3, and t4, there is no unique position solution. Multiple sets of measurements are thus required for the position solution to converge, resulting in slow system response.

A solution for simplified Indoor Location operation with reduce airtime, lower STA power consumption, simpler operation, and easier deployment is sought.

SUMMARY

A method of a ranging and positioning with sensor STA/neighbor AP is proposed. An initiating wireless device establishes an FTM procedure with a responding wireless device in an indoor wireless local area network. The initiating device exchanges FTM frames with the responding device and thereby receiving a first set of timestamps from the responding device. The initiating device receives a second set of timestamps associated with the exchanged FTM frames from one or more listening devices. Finally, the initiating device determines location information from the first and the second set of timestamps.

In one embodiment, the initiating device is a non-AP station (STA) and the responding device is an AP. The STA sends an FTM request to the AP to establish the FTM procedure. The AP sends an ACK frame back to the STA, which may contain information of its related sensor network/neighbor AP configuration information including the number of sensor STAs/Neighbor APs and Sensor STA/Neighbor AP IDs and locations. Optionally, the initiating STA might obtain the sensor network/neighbor AP information via other means or from prior session. After receiving an FTM frame and in response sending an ACK frame, the STA receives the first set of timestamps, which includes a transmitting timestamp of the FTM frame and a receiving timestamp of the ACK frame. The second set of timestamps includes receiving timestamps of the exchanged FTM and ACK frames received by the one or more listening wireless devices. Each of the one or more listening wireless stations is a non-AP STA or a neighbor AP in the sensor network/neighbor APs. Based on the received first and second set of timestamps, the initiating STA is able to compute the distance to the responding AP and to the multiple listening devices during the same FTM frame exchange burst, and thereby determining its absolute location more efficiently.

In another embodiment, the initiating device is an AP and the responding device is a non-AP station (STA). Upon completing the FTM procedure with sensor STAs/neighbor APs, the AP determines the STA location and sends the location information to the STA.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 2A:
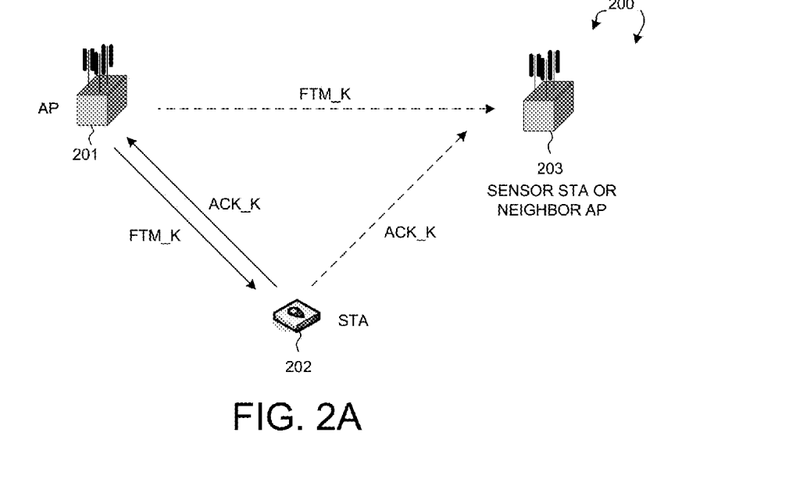
FIG. 2A illustrates a wireless local area network with sensor STA/neighbor AP ranging and positioning in accordance with one novel aspect.

FIG. 2A illustrates a wireless local area network 200 with sensor STA/neighbor AP ranging and positioning in accordance with one novel aspect. Wireless local area network 200 is an indoor network and comprises an access point AP 201, a wireless non-AP station STA 202, and a sensor STA or neighbor AP 203. Here a sensor STA is defined as a non-AP STA that constantly listens to the wireless medium for FTM frames. Both the sensor STA and the neighbor AP are capable of identifying the transmitter and recipient of the FTM frames received and making timing measurements on these frames. In the example of FIG. 2A, AP 201 is used to provide positioning service for STA 202 in an indoor environment via Fine Timing Measurement (FTM) protocol. Based on FTM, an initiating station exchanges FTM frames with a responding station to measure the time-of-flight (TOF) or the Round Trip Delay (RTD/2). The initiating station then computes its range to the responding station after receiving timing measurements (i.e., timestamps corresponding to the departure time and arrival time of the FTM frames) from the responding station. To calculate a station position, the station (STA) performs ranging measurements with multiple access points (APs) via FTM frame exchange and obtains AP's positions. FTM positioning requires the initiating station to exchange FTM frames with multiple responding APs for TOF measurements in order to determine its absolute location. For three-dimensional (3D) positioning, the station needs to exchange FTM frames with four APs in order to determine its absolute location.

In accordance with one novel aspect, a simplified Indoor Location operation with reduce airtime, lower STA power consumption, simpler operation, and easier deployment is proposed. As illustrated in FIG. 2A, STA 202 initiates an FTM procedure with AP 201. STA 202 and AP 201 exchanges FTM frames (e.g., FTM_K and ACK_K) for timestamps measurements. AP 201 passes the measured timestamps to STA 202 for TOF calculation. In addition, the sensor STA or neighbor AP 203 is a listening STA that listens to the FTM frame exchange between AP 201 and STA 202. The listening STA 203 has the capability to snoop and perform timing measurement on the FTM frames not destined for itself 203 but transmitted by AP 201 to STA 202 or by STA 202 to AP 201. If the listening STA 203 is a non-AP STA, it is either associated with the AP 201 or other nearby AP. The listening STA is configured to snoop on any FTM frames in the wireless medium. The listening STA 203 measures the time-of-arrival of the received FTM frames (e.g., FTM_K and ACK_K) from both AP 201 and STA 202. The listening STA 203 then passes the measured timestamps to STA 202 such that STA 202 can determine the TOF (time of flight) between itself 202 and the listening STA 203 based on the measured timestamps from both AP 201 and the listening STA 203. One or more listening STAs can be strategically deployed in different physical locations to facilitate such Indoor Locationing. The initiating STA can perform FTM ranging with a mixture of the sensor STA network(s) and/or with snooping neighbor APs or non-snooping APs.

Figure 2B:
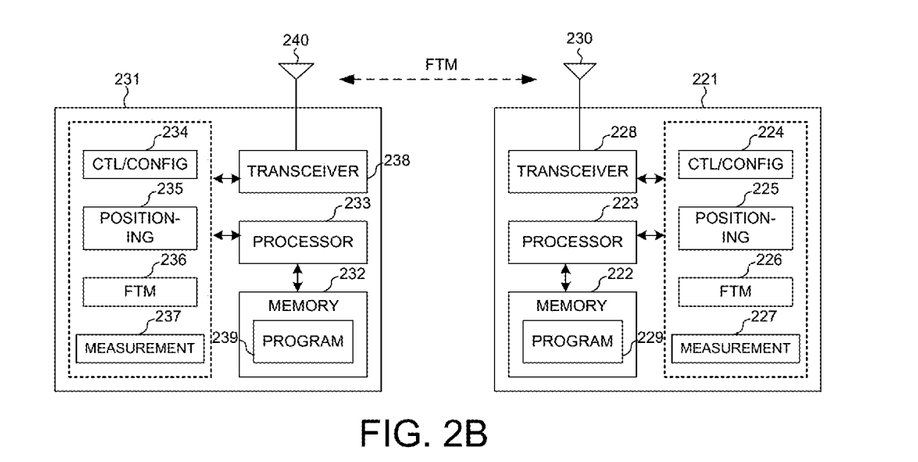
FIG. 2B is a simplified bock diagram of an initiating device and a responding device that carry out certain embodiment of the invention.

FIG. 2B is a simplified bock diagram of an initiating device 221 and a responding device 231 that carry out certain embodiment of the invention. The initiating device is referred to as an initiator, and the responding device is referred to as a responder. Both devices can be an AP station or a non-AP station. Initiating device 221 comprises memory 222, a processor 223, a control and configuration module 224, a positioning module 225, an FTM module 226, and a measurement module 227, and a transceiver 228 coupled to antenna 230. Similarly, responding device 231 comprises memory 232, a processor 233, a control and configuration module 234, a positioning module 235, an FTM module 236, a measurement module 237, and a transceiver 238 coupled to antenna 240. In another example (not shown), a listening STA is a sensor STA or neighbor AP that simply listens to frames, performs measurements, and sends out timestamps. In the transmitting direction, the transceiver converts received baseband signals from the processor to RF signals and sends out to the antenna. In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 223 and 233 (via program instructions 229 and 239 contained in memory 222 and 232), interwork with each other to allow the wireless devices to perform enhanced channel access. For example, the measurement module performs FTM measurement frame timing measurements, the FTM module establishes the FTM procedure involving setup phase, measurement phase, and tear down phase, the positioning module determines the absolute location of the wireless device based on the FTM measurement result, and the control and configuration module configures FTM related parameters and controls the FTM procedure. The FTM related timing measurements are the departure time of a specific reference point at the transmit frame and the arrival of time of a specific reference point at the receive frame. The hardware delay within the signal path in the transceiver and cable should be calibrated and removed to yield the accurate timestamp measurements at the antenna.

Figure 3:
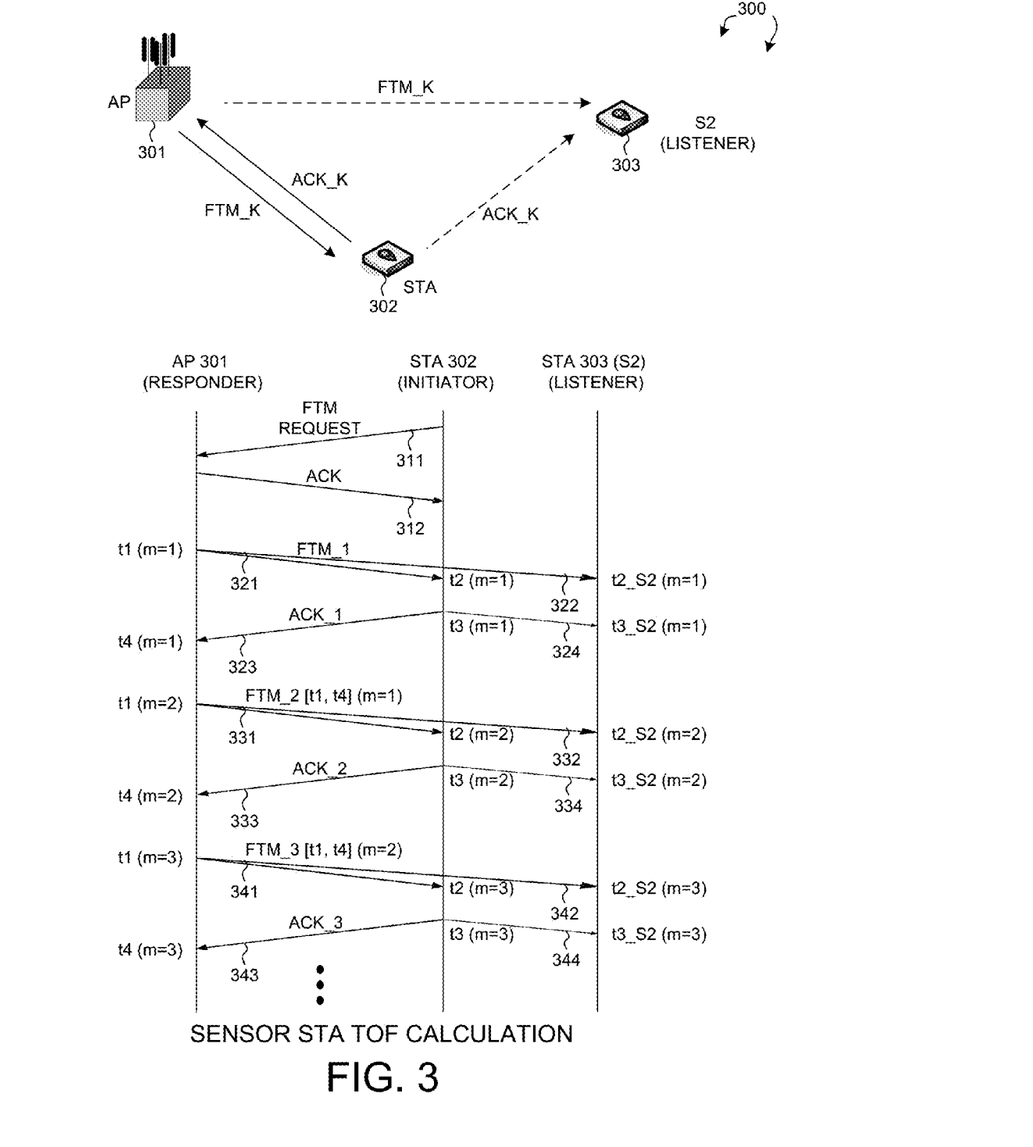
FIG. 3 illustrates a ranging and positioning process and TOF calculation with one listening STA.

FIG. 3 illustrates a ranging and positioning process and TOF calculation of a listening STA in a wireless local area network 300. Wireless local area network 300 comprises an AP 301, an STA 302, and a listening STA 303. For simplicity, only one listening STA 303 is shown. In the example of FIG. 3, STA 302 is an initiating STA that initiates an FTM positioning procedure, while AP 301 is a responding STA that responds to the FTM positioning procedure. The listening STA 303 is a snooping device that is either a sensor STA or a neighbor AP that passively listens to FTM frame exchanges (e.g., FTM_K and ACK_K) between AP 301 and STA 302. STA 303 is also denoted as S2 in FIG. 3.

In step 311, STA 302 initiates an FTM procedure by sending an FTM request to AP 301. In step 312, AP 301 accepts the FTM request and sends an ACK frame back to STA 302. After setting up the FTM procedure, AP 301 starts a first measurement session (m=1). In step 321, AP 301 transmits a first FTM measurement frame FTM_1 at time instance t1 (m=1), which denotes the first measurement session. STA 302 receives FTM_1 at time instance t2 (m=1). Meanwhile, in step 322, snooping device S2 also receives FTM_1 at time instance t2_S2 (m=1). In step 323, STA 302 transmits an ACK_1 frame to AP 301 at time instance t3 (m=1) in response to FTM_1. AP 301 receives the ACK_1 frame at time instance t4 (m=1). Meanwhile, in step 324, snooping device S2 also receives the ACK_1 at time instance t3_S2 (m=1). AP 301 then starts a second measurement session (m=2). In step 331, AP 301 transmits a second FTM measurement frame FTM_2 at time instance t1 (m=2), which denotes the second measurement session. The FTM_2 payload also includes the timestamps t1 (m=1) and t4 (m=1) of the first measurement session. Meanwhile, in step 332, snooping device S2 also receives FTM_2 at time instance t2_S2 (m=2). In step 333, STA 302 transmits an ACK_2 frame to AP 301 at time instance t3 (m=2) in response to FTM_2. AP 301 receives the ACK_2 frame at time instance t4 (m=2). Meanwhile, in step 334, snooping device S2 also receives the ACK_2 at time instance t3_S2 (m=2). The same FTM frame exchange continues between FTM_3 from AP 301 and ACK_3 from STA 302 (e.g., steps 341 to 344 for the third measurement session) and so on so forth. A dialog token carried within the FTM frame is used as an identification of the corresponding timestamp measurements at the AP and the STA. Timestamps and dialog token, which identifies the FTM and ACK frames in which timestamps are measured, are transferred together for use in range calculation.

Based on the FTM measurement results, STA 302 computes the time-of-flight (TOF) or Round Trip Delay (ROD/2) and its corresponding range/distance to AP 301 and S2. For example, denote TOF from STA 302 to AP 301 as TOF (STA-AP), denote TOF from AP 301 to STA 303 (S2) as TOF (AP-S2), and denote TOF from STA 302 to STA 303 (S2) as TOF(STA-S2). We have:

$$TOF(STA\text{-}AP) = [(t4_{(AP)} - t1_{(AP)}) - (t3_{(STA)} - t2_{(STA)})]/2.$$

Note that timestamp subscript labels indicate which time bases (i.e., AP's clock or STA's clock) the timestamps, t4, t1, t3, t2, are based on.

Before proceeding further, the clock offsets between AP 301, STA 302, and S2 303 are derived first. For the sake of simplicity, it is assumed that the clock frequencies of AP 301, STA 302, S2 303 are the same (i.e., errors due to clock frequency offsets are negligible within the duration of an FTM frame exchange). The time instant t1 is based on AP's clock, which corresponds to $t1_{(AP)} + \Delta_{AP\text{-}S2}$ in sensor STA 303 S2's clock after the clock offset, $\Delta_{AP\text{-}S2}$, is added. Given that AP 301 and S2 303 locations are known to STA 302, STA 302 calculates the clock offset $\Delta_{AP\text{-}S2}$ between AP 301 and S2 303 using the following equation:

$$t2\_S2_{(S2)} = t1_{(AP)} + TOF(AP\text{-}S2) + \Delta_{AP\text{-}S2}$$

Namely, the receive timestamp t2_S2 is equal to the departure time (in sensor S2's clock) plus TOF(AP-S2).

Similarly, the transmit timestamp t1 is based on AP's clock, which corresponds to $t1_{(AP)} + \Delta_{AP\text{-}STA}$ in STA's clock after the clock offset, $\Delta_{AP\text{-}STA}$, is added. STA 302 thus calculates its clock offset with AP from the following equation:

$$t2_{(STA)} = t1_{(AP)} + TOF(AP\text{-}STA) + \Delta_{AP\text{-}STA}$$

Additionally, the timestamp t3_S2 is given by:

$$t3\_S2_{(S2)} = t3_{(STA)} + TOF(STA\text{-}S2) + \Delta_{STA\text{-}S2}$$

Thus, $$t3\_S2_{(S2)} - t2\_S2_{(S2)} = t3_{(STA)} + TOF(STA\text{-}S2) - (t1_{(AP)} + TOF(AP\text{-}S2)) + \Delta_{STA\text{-}S2} - \Delta_{AP\text{-}S2}$$

$$TOF(STA\text{-}S2) = [t3\_S2_{(S2)} - t2\_S2_{(S2)}] + [t1_{(AP)} - t3_{(STA)}] + TOF(AP\text{-}S2) - \Delta_{STA\text{-}AP}$$

and

Distance to $AP = C * TOF(STA\text{-}AP)$

Distance to $S2 = C * TOF(STA\text{-}S2)$

Note the clock offset between S2 303 and STA 302 satisfy the following: $\Delta_{STA\text{-}S2} = \Delta_{AP\text{-}S2} - \Delta_{AP\text{-}STA}$
where
C is the speed of radio signal.

If the sensor STA or the neighbor AP (S2) transfers timestamps t2_S2 and t3_S2 to the initiating station STA 302, then STA 302 is able to compute the distance to AP 301 and to S2. Note that the distance between AP 301 and S2 is known priori, thus TOF(AP-S2) is also known. Therefore, if there are more snooping devices Sn (n=2, 3, 4, ... ) that are strategically deployed in different physical locations and transfer corresponding measuring timestamps to the initiating station, then the initiating station should be able to compute the distance to the responding AP and to the multiple snooping devices Sn in a single FTM frame exchange measurement session, and thereby determining its absolute location accordingly.

Figure 4:
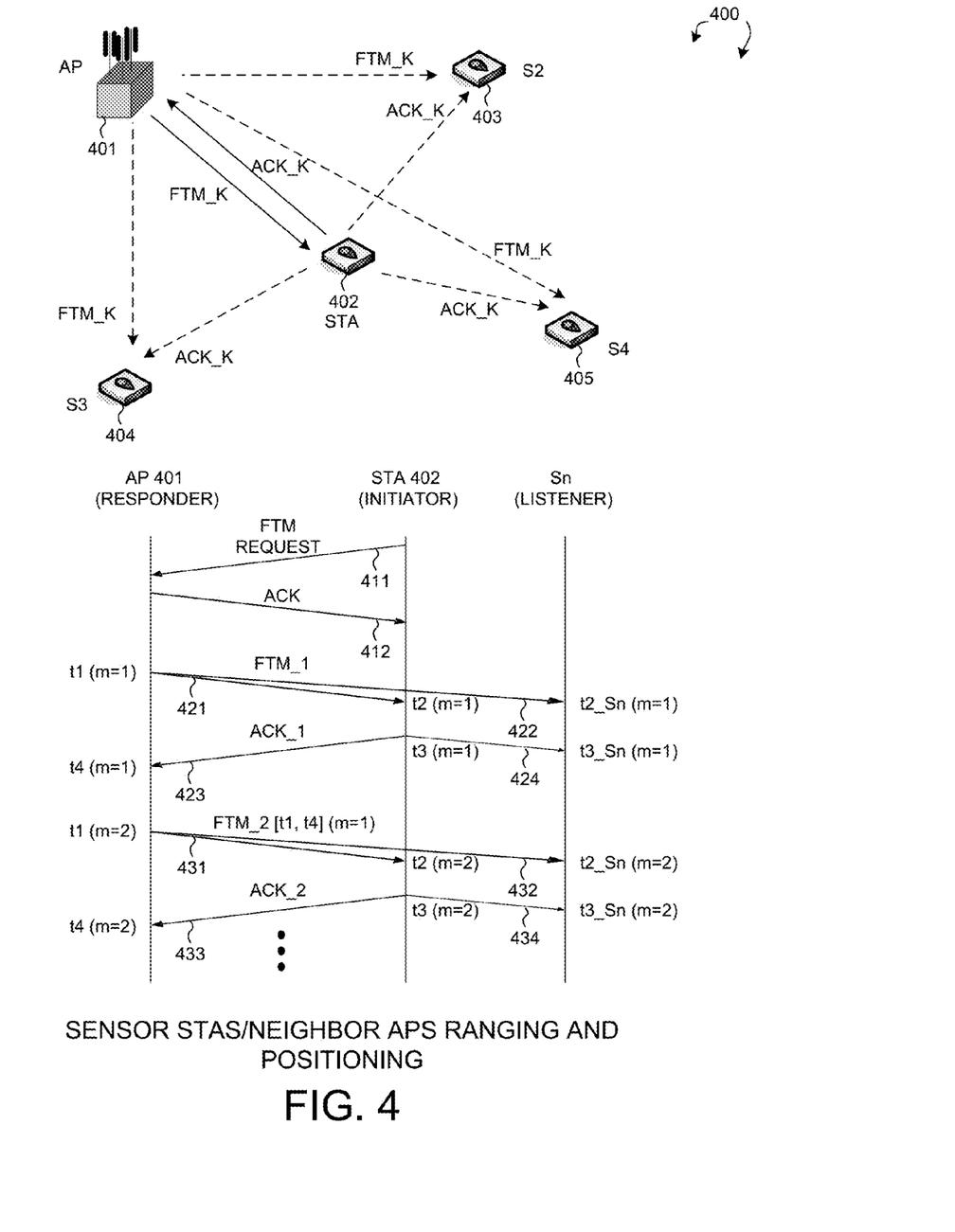
FIG. 4 illustrates a ranging and positioning process and TOF calculation with multiple listening STAs.

FIG. 4 illustrates a ranging and positioning process and TOF calculation with multiple listening STAs in a wireless local area network 400. Wireless local area network 400 comprises an AP 401, an STA 402, and multiple listening STAs 403-405. In the example of FIG. 4, STA 402 is an initiating STA that initiates an FTM positioning procedure, while AP 401 is a responding STA that responds to the FTM positioning procedure. Each listening STA 403-405 is a snooping device that is either a sensor STA or a neighbor AP that passively listens to FTM frame exchanges between AP 401 and STA 402. STAs 403-405 are also denoted as Sn (e.g., S2, S3, and S4, where n=2, 3, and 4) in the example of FIG. 4.

In step 411, STA 402 initiates an FTM procedure by sending an FTM request to AP 401. In step 412, AP 401 accepts the FTM request and sends an ACK frame back to STA 402. After setting up the FTM procedure, AP 401 starts a first measurement session (m=1). In step 421, AP 401 transmits a first FTM measurement frame FTM_1 at time instance t1 (m=1), which denotes the first measurement session. STA 402 receives FTM_1 at time instance t2 (m=1). Meanwhile, in step 422, each snooping devices Sn also receives FTM_1 at time instance t2_Sn (m=1). In step 423, STA 402 transmits an ACK_1 frame to AP 401 at time instance T3 (m=1) in response to FTM_1. AP 401 receives the ACK_1 frame at time instance t4 (m=1). Meanwhile, in step 424, each snooping device Sn also receives the ACK_1 at time instance t3_Sn (m=1). The same FTM frame exchange may happen between FTM_2 from AP 401 and ACK_2 from STA 402 (e.g., steps 431 to 434 for the second measurement session) and so on so forth.

Based on the FTM measurement results, STA 402 computes the time-of-flight (TOF) or Round Trip Delay (ROD/2) and its corresponding range/distance to AP 401 and Sn. We have:

$$TOF(STA\text{-}AP) = [(t4-t1)-(t3-t2)]/2$$

$$TOF(STA\text{-}S2) = [t3\_S2 - t2\_S2] + [t1 - t3] + TOF(AP\text{-}S2) - \Delta_{STA\text{-}AP}$$

$$TOF(STA\text{-}S3) = [t3\_S3 - t2\_S3] + [t1 - t3] + TOF(AP\text{-}S3) - \Delta_{STA\text{-}AP}$$

$$TOF(STA\text{-}S4) = [t3\_S4 - t2\_S4] + [t1 - t3] + TOF(AP\text{-}S4) - \Delta_{STA\text{-}AP}$$

and $$\text{Distance to AP} = C * TOF(STA\text{-}AP)$$

$$\text{Distance to } S2 = C * TOF(STA\text{-}S2)$$

$$\text{Distance to } S3 = C * TOF(STA\text{-}S3)$$

$$\text{Distance to } S4 = C * TOF(STA\text{-}S4)$$

where

C is the speed of radio signal.

If each sensor STA or the neighbor AP (Sn) transfers timestamps t2_Sn and t3_Sn to the initiating station STA 402, then STA 402 is able to compute the distance to AP 401 and to each Sn. Note that the distance between AP 401 and Sn is known priori, thus TOF(AP-Sn) is also known. Therefore, if snooping devices Sn (n=2, 3, 4, ... ) are strategically deployed in different physical locations and transfer corresponding measuring timestamps to the initiating station, then the initiating station should be able to compute the distance to the responding AP and to the multiple snooping devices Sn in a single FTM frame exchange measurement session, and thereby determining its absolute location accordingly.

By utilizing sensor STA/neighbor AP for ranging and positioning, there are two possible protocols. A first protocol is based on STA initiated FTM ranging and positioning, and a second protocol is based on AP initiated FTM ranging and positioning.

Figure 5:
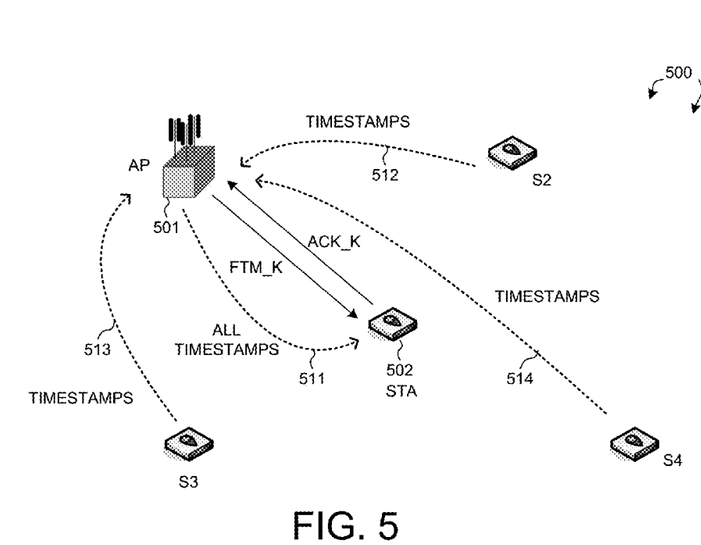
FIG. 5 illustrates a first embodiment of ranging and positioning with sensor STA/neighbor AP.

FIG. 5 illustrates a first embodiment of STA initiated ranging and positioning protocol with sensor STA/neighbor AP in a wireless local area network 500. Wireless local area network 500 comprises a responding AP 501, an initiating STA 502, and a plurality of sensor STAs/neighbor APs S2-S4. In the example of FIG. 5, the initiating STA 502 setups an FTM procedure by sending an FTM request to responding AP 501. The responding AP may inform the initiator STA its sensor network/neighbor AP configuration information via sending an ACK frame back to the initiating STA during the FTM setup. The configuration information includes the number of sensor STAs/Neighbor APs and Sensor STA/Neighbor AP IDs and locations in addition to the responding AP's location information.

After completing an FTM frame exchange burst (e.g., FTM_K from AP to STA, and ACK_K from STA to AP), each of the sensor STAs/neighbor APs S2-S4 transfers its measured timestamps to responder AP 501, as depicted by dotted lines 512-514, respectively. In one embodiment, the sensor STAs/neighbor APs S2-S4 are connected to AP 501 through backhaul channel (e.g., wired channel such as wired Ethernet). As a result, the sensor STAs/neighbor APs S2-S4 can send the measured timestamps to the AP through backhaul channel. The timestamps may be identified by dialog token or sensor STA/neighbor AP ID. Later, responder AP 501 transfers all the timestamps to initiating STA 502, as depicted by dotted line 511. The initiating STA 502 is then able to compute its location based on the received timestamps.

Figure 6:
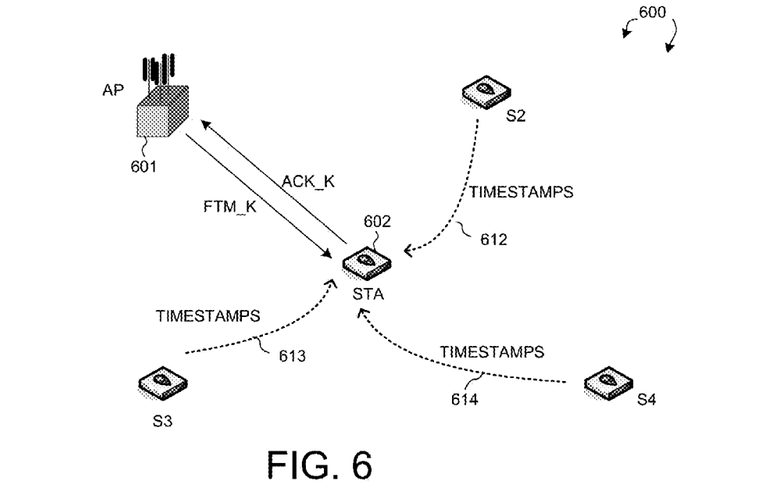
FIG. 6 illustrates a second embodiment of ranging and positioning with sensor STA/neighbor AP.

FIG. 6 illustrates a second embodiment of STA initiated ranging and positioning protocol with sensor STA/neighbor AP in a wireless local area network 600. Wireless local area network 600 comprises a responding AP 601, an initiating STA 602, and a plurality of sensor STAs/neighbor APs S2-S4. In the example of FIG. 6, the initiating STA 602 setups an FTM procedure by sending an FTM request to responding AP 601. The responding AP may inform the initiator STA its sensor network/neighbor AP configuration information via sending an ACK frame back to the initiating STA during the FTM setup. The configuration information includes the number of sensor STAs/Neighbor APs and Sensor STA/Neighbor AP IDs in addition to the responding AP's location information. After completing an FTM frame exchange burst (e.g., FTM_K from AP to STA, and ACK_K from STA to AP), each of the sensor STAs/neighbor APs S2-S4 transfers its measured timestamps to initiating STA 602 directly without involving AP 601, as depicted by dotted lines 612-614, respectively. Note that the sensor network/neighbor AP configuration information may also be sent to the initiating STA directly. The timestamps may be identified by dialog token or sensor STA/neighbor AP ID. The initiating STA 602 is then able to compute its location based on the timestamps.

Figure 7:
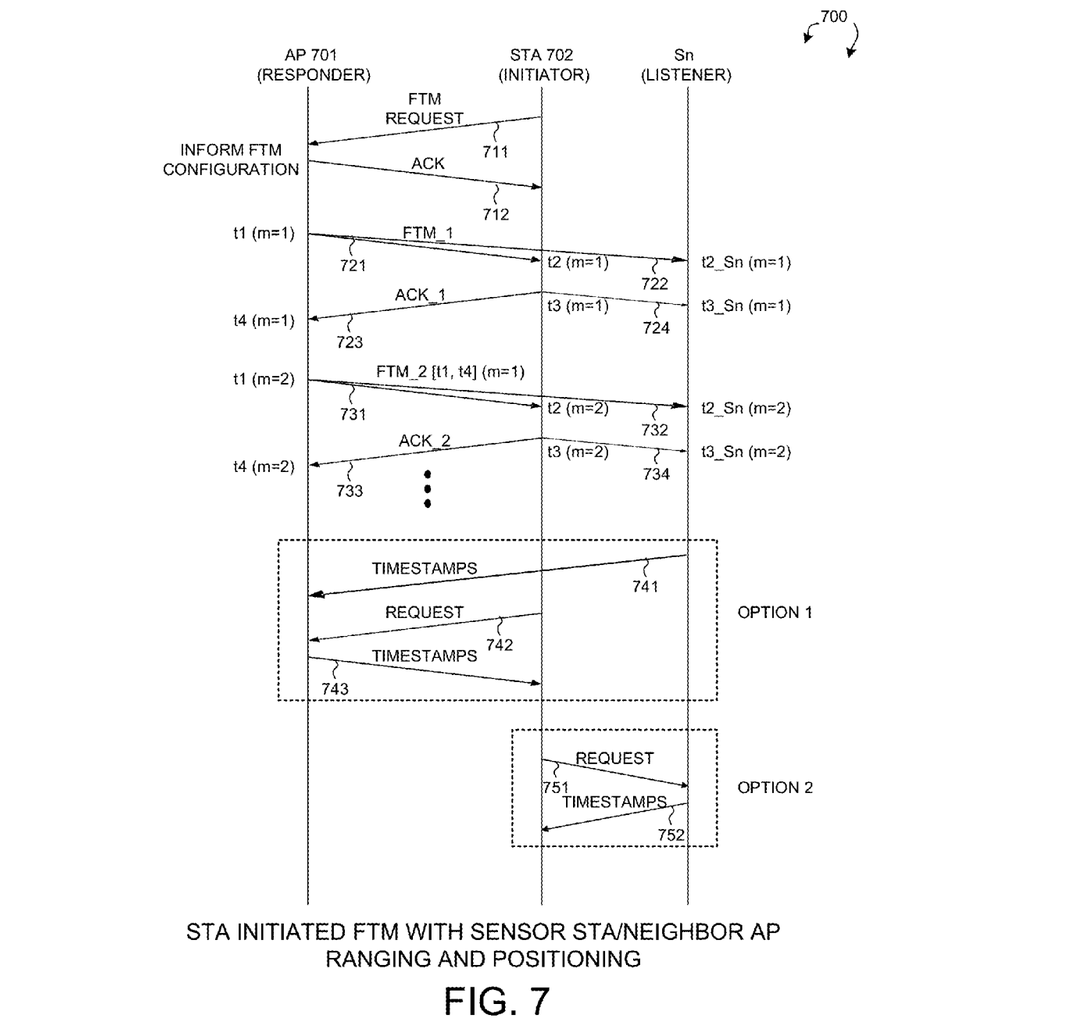
FIG. 7 illustrates an embodiment of a station initiated ranging and positioning procedure with sensor STA/neighbor AP.

FIG. 7 illustrates an STA initiated ranging and positioning procedure with sensor STA/neighbor AP in a wireless local area network 700. Wireless local area network 700 comprises a responding AP 701, an initiating STA 702, and a plurality of sensor STAs/neighbor APs (Sn). In step 711, initiating STA 702 sends an FTM request to responder AP 701. In step 712, responder AP 701 sends an ACK back to initiating STA 702. The AP informs the STA its sensor network/neighbor AP configuration information. After FTM setup, AP 701 and STA 702 starts an FTM burst with FTM frame exchanges. In step 721, AP 701 transmits a first FTM measurement frame FTM_1 at time instance t1 (m=1), which denotes the first FTM frame exchange. STA 702 receives FTM_1 at time instance t2 (m=1). Meanwhile, in step 722, each snooping device Sn also receives FTM_1 at time instance t2_Sn (m=1). In step 723, STA 702 transmits an ACK_1 frame to AP 701 at time instance t3 (m=1) in response to FTM_1. AP 701 receives the ACK_1 frame at time instance t4 (m=1). Meanwhile, in step 724, each snooping device Sn also receives the ACK_1 at time instance t3_Sn (m=1). Next, in step 731, AP 701 transmits a second FTM measurement frame FTM_2 at time instance t1 (m=2), which denotes the second FTM frame exchange. The FTM_2 payload also includes the timestamps t1 (m=1) and t4 (m=1) of the first FTM frame exchange. STA 702 receives FTM_2 at time instance t2 (m=2). Meanwhile, in step 732, each snooping device Sn also receives FTM_1 at time instance t2_Sn (m=2). In step 733, STA 702 transmits an ACK_2 frame to AP 701 at time instance t3 (m=2) in response to FTM_2. AP 701 receives the ACK_2 frame at time instance t4 (m=2). Meanwhile, in step 734, each snooping device Sn also receives the ACK_2 at time instance t3_Sn (m=2). After completing the FTM burst with several FTM frame exchanges, STA 702 is ready to receive the measured timestamps from the snooping devices Sn.

In a first option, each Sn first sends the timestamps (t2_Sn and t3_Sn) to AP 701 (step 741), STA 702 optionally sends a request to AP 701 (step 742), and AP 701 finally sends the timestamps to STA 702 (step 743). In a second option, STA 702 optionally sends a request to each Sn (step 751), and each Sn sends the time stamps (t2_Sn and T3_Sn) to STA 702 directly (step 752). After obtaining the timestamps, STA 702 is able to compute its distance to AP 701 and to each of the snooping devices Sn and determine its location.

Figure 8:
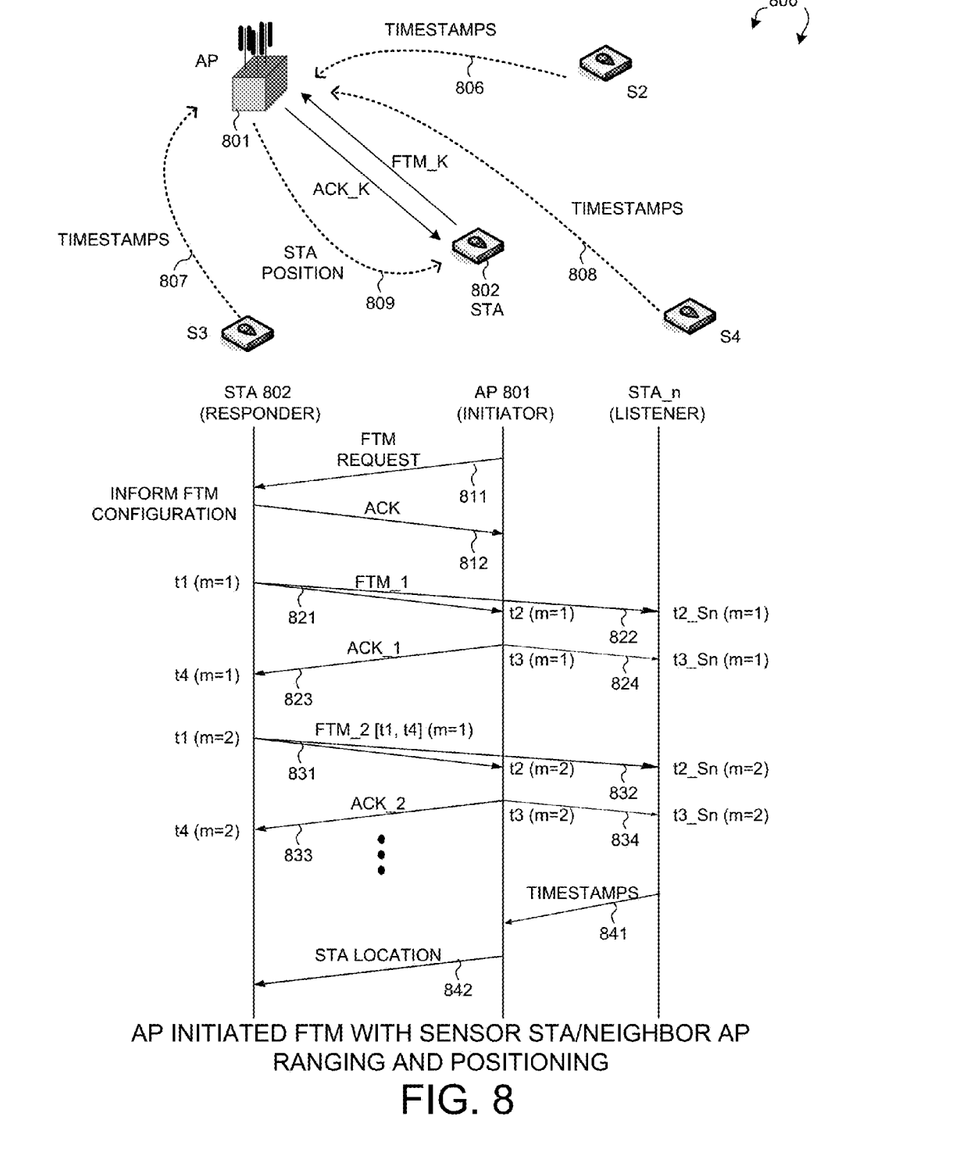
FIG. 8 illustrates an embodiment of an access point initiated ranging and positioning procedure with sensor STA/neighbor AP.

FIG. 8 illustrates an AP initiated ranging and positioning procedure with sensor STA/neighbor AP in a wireless local area network 800. Wireless local area network 800 comprises an initiating AP 801, a responding STA 802, and a plurality of sensor STAs/neighbor APs (Sn). In the example of FIG. 8, the initiating AP 801 setups an FTM procedure by sending an FTM request to responding STA 802. The initiator AP 801 knows its sensor network/neighbor AP configuration information a priori. The configuration information includes the number of sensor STAs/Neighbor APs, Sensor STA/Neighbor AP IDs and locations. After completing an FTM frame exchange burst (e.g., FTM_K from STA to AP, and ACK_K from AP to STA), each of the sensor STAs/neighbor APs S2-S4 transfers its measured timestamps to initiating AP 801, as depicted by dotted lines 806-808, respectively. In one embodiment, the sensor STAs/neighbor APs S2-S4 are connected to AP 801 through back channel (e.g., wired channel such as wired Ethernet, not shown). As a result, the sensor STAs/neighbor APs S2-S4 can send the measured timestamps to the AP through backhaul channel. The timestamps may be identified by dialog token or sensor STA/neighbor AP ID. The initiating AP 801 is then able to compute the STA location based on the timestamps. AP 801 then can send the STA location information to STA 802, as depicted by dotted line 809.

In step 811, initiating AP 801 sends an FTM request to responder STA 802. In step 812, responder STA 802 sends an ACK back to initiating AP 801. After FTM setup, AP 801 and STA 802 start an FTM burst with FTM frame exchanges. In step 821, STA 802 transmits a first FTM measurement frame FTM_1 at time instance t1 (m=1), which denotes the first FTM frame exchange. AP 801 receives FTM_1 at time instance t2 (m=1). Meanwhile, in step 822, each snooping device Sn also receives FTM_1 at time instance t2_Sn (m=1). In step 823, AP 801 transmits an ACK_1 frame to STA 802 at time instance t3 (m=1) in response to FTM_1. STA 802 receives the ACK_1 frame at time instance t4 (m=1). Meanwhile, in step 824, each snooping device Sn also receives the ACK_1 at time instance t3_Sn (m=1). Next, in step 831, STA 801 transmits a second FTM measurement frame FTM_2 at time instance t1 (m=2), which denotes the second FTM frame exchange. The FTM_2 payload also includes the timestamps t1 (m=1) and t4 (m=1) of the first FTM frame exchange. AP 801 receives FTM_2 at time instance t2 (m=2). Meanwhile, in step 832, each snooping device Sn also receives FTM_1 at time instance t2_Sn (m=2). In step 833, AP 801 transmits an ACK_2 frame to STA 802 at time instance T3 (m=2) in response to FTM_2. STA 802 receives the ACK_2 frame at time instance t4 (m=2). Meanwhile, in step 834, each snooping device Sn also receives the ACK_2 at time instance t3_Sn (m=2). After completing the FTM burst with several FTM frame exchanges, AP 801 receives the measured timestamps (t2_Sn and t3_Sn) from the snooping devices Sn in step 841. Finally, in step 842, AP 801 determines the STA location information and sends to STA 802.

Figure 9:
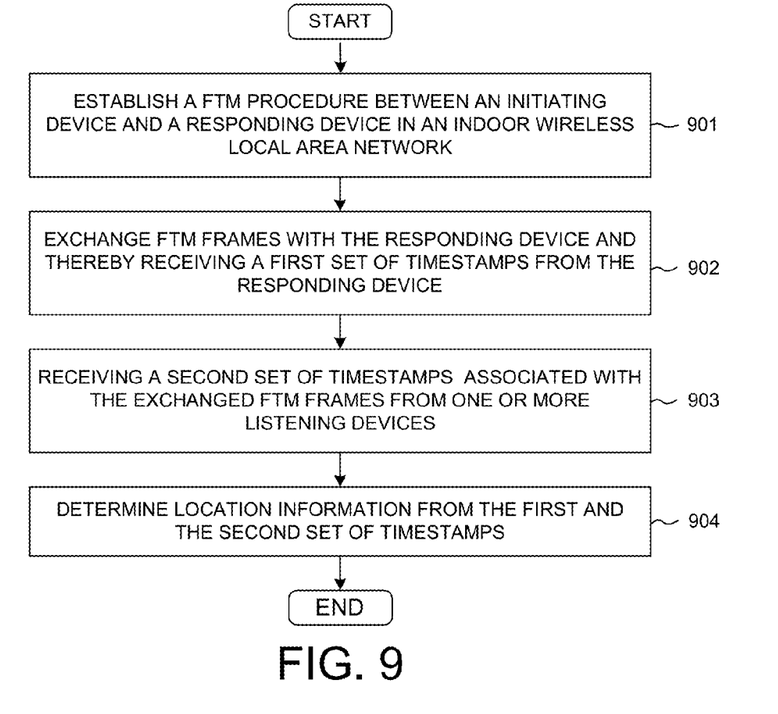
FIG. 9 is a flow chart of a method of a ranging and positioning with sensor STA/neighbor AP in accordance with one novel aspect.

FIG. 9 is a flow chart of a method of a ranging and positioning with sensor STA/neighbor AP in accordance with one novel aspect. In step 901, an initiating wireless device establishes an FTM procedure with a responding wireless device in an indoor wireless local area network. In step 902, the initiating device exchanges FTM frames with the responding device and thereby receiving a first set of timestamps from the responding device. In step 903, the initiating device receives a second set of timestamps associated with the exchanged FTM frames from one or more listening devices. In step 904, the initiating device determines location information from the first and the second set of timestamps.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
   (a) establishing a fine timing measurement (FTM) procedure between an initiating wireless device and a responding wireless device in an indoor wireless local area network (WLAN);
   (b) exchanging FTM frames with the responding wireless device and thereby receiving a first set of timestamps from the responding wireless device;

(c) receiving a second set of timestamps associated with the exchanged FTM frames from one or more listening wireless devices, wherein the one or more listening wireless devices is not the initiating wireless device or the responding wireless device; and (d) determining location information based on the first set and the second set of timestamps, wherein steps (a) through (d) are performed by the initiating wireless device.

2. The method of claim 1, wherein the FTM frame exchange comprises receiving an FTM frame from the responding wireless device and in response transmitting an ACK frame to the responding wireless device.

3. The method of claim 2, where the first set of timestamps comprises a transmitting timestamp of the FTM frame and a receiving timestamp of the ACK frame of the responding wireless device.

4. The method of claim 1, wherein the one or more listening wireless devices is a neighbor access point (AP) or a non-AP sensor station (STA).

5. The method of claim 4, wherein the second set of timestamps including receiving timestamps of the exchanged FTM frames received by the one or more listening wireless devices.

6. The method of claim 4, wherein the second set of timestamps are identified by a dialog token contained in the corresponding exchanged FTM frames.

7. The method of claim 4, wherein the second set of timestamps are sent by the listening wireless devices through backhaul channel.

8. The method of claim 1, wherein (a) involves:
transmitting an FTM request to the responding wireless device; and
receiving an ACK frame from the responding wireless device, wherein the ACK frame comprises information about the listening wireless device identity, location, and configuration.

9. The method of claim 1, wherein the initiating wireless device is a non-AP station (STA), and wherein the responding wireless device is an access point (AP).

10. The method of claim 9, wherein the initiating non-AP STA receives the second set of timestamps from the responding AP or from the one or more listening wireless devices directly.

11. The method of claim 9, wherein the initiating non-AP STA receives the listening wireless device identity, location, and configuration directly.

12. The method of claim 1, wherein the initiating wireless device is an access point (AP), and wherein the responding wireless device is a non-AP station (STA).

13. The method of claim 12, wherein the initiating AP transmits the location information to the non-AP STA.

14. An initiating wireless device, comprising:
a configuration module that establishes a fine timing measurement (FTM) procedure with a responding wireless device in an indoor wireless local area network (WLAN);
an FTM module that exchanges FTM frames with the responding wireless device and thereby receiving a first set of timestamps from the responding wireless device;
a receiver that receives a second set of timestamps associated with the exchanged FTM frames from one or more listening wireless devices, wherein the one or more listening wireless devices is not the initiating wireless device or the responding wireless device; and
a positioning module that determines location information based on the first set and the second set of timestamps.

15. The initiating wireless device of claim 14, wherein the FTM frame exchange comprises receiving an FTM frame from the responding wireless device and in response transmitting an ACK frame to the responding wireless device.

16. The initiating wireless device of claim 15, where the first set of timestamps comprises a transmitting timestamp of the FTM frame and a receiving timestamp of the ACK frame of the responding wireless device.

17. The initiating wireless device of claim 14, wherein the one or more listening wireless devices is a neighbor access point (AP) or a non-AP sensor station (STA).

18. The initiating wireless device of claim 17, wherein the second set of timestamps including receiving timestamps of the exchanged FTM frames received by the one or more listening wireless devices.

19. The initiating wireless device of claim 17, wherein the second set of timestamps are identified by a dialog token contained in the corresponding exchanged FTM frames.

20. The initiating wireless device of claim 14, wherein the initiating wireless device transmits an FTM request to the responding wireless device and in response receives an ACK from the responding wireless device, and wherein the ACK comprises information about the listening wireless device identity, location, and configuration.

21. The initiating wireless device of claim 14, wherein the initiating wireless device is a non-AP station (STA), and wherein the responding wireless device is an access point (AP).

22. The initiating wireless device of claim 21, wherein the initiating non-AP STA receives the second set of timestamps from the responding AP or from the one or more listening wireless devices directly.

23. The device of claim 21, wherein the initiating non-AP STA receives the listening wireless device identity, location, and configuration directly.

24. The device of claim 14, wherein the initiating wireless device is an access point (AP), and wherein the responding wireless device is a non-AP station (STA).

* * * * *